United States Patent [19]

Fiala

[11] 4,385,290

[45] May 24, 1983

[54] LIQUID LEVEL SENSING CIRCUITRY
[75] Inventor: Jimmy L. Fiala, Minneapolis, Minn.
[73] Assignee: Minnesota Mining and Manufacturing Co., St. Paul, Minn.
[21] Appl. No.: 296,064
[22] Filed: Aug. 25, 1981
[51] Int. Cl.³ .............................................. G08B 21/00
[52] U.S. Cl. ....................................... 340/620; 340/59
[58] Field of Search ............... 340/620, 59; 73/304 R, 73/304 C; 235/92 FL

[56] References Cited

U.S. PATENT DOCUMENTS

| | | | |
|---|---|---|---|
| 3,967,238 | 6/1976 | Ridpath et al. ........................ | 340/59 |
| 3,978,464 | 8/1976 | Miesterfeld ........................... | 340/620 |
| 4,263,587 | 4/1981 | John ..................................... | 340/620 |

Primary Examiner—John W. Caldwell, Sr.
Assistant Examiner—Daniel Myer
Attorney, Agent, or Firm—Cruzan Alexander; Donald M. Sell; Robert L. Marben

[57] ABSTRACT

Liquid level sensing circuitry useable for detecting the presence of an acceptable or unacceptable level for a liquid, such as engine oil. Prior to termination of the operation of the engine, the circuitry presents an unacceptable level indication at a control point. After completion of a time delay following termination of engine operation, an acceptable level must be presented for a time to cause an acceptable level indication at the control point which is maintained pending initiation of engine operation. Upon initiation of engine operation a first discernible indication is provided for a time period if the control point presents an unacceptable level indication with a second discernible indication provided for such time period if the control point presents an acceptable level indication.

8 Claims, 2 Drawing Figures

LIQUID LEVEL SENSING CIRCUITRY

BACKGROUND OF THE INVENTION

This invention relates to liquid level sensing circuitry and to such circuitry which is particularly suitable for the electronic detection of engine crankcase oil level for determining whether the oil is at an acceptable or unacceptable level.

Monitoring the crankcase oil level for essentially all automobiles and other engine driven equipment presently in use is carried out by the visual inspection of the oil level as indicated on a dip stick that must be manually withdrawn from an engine. Heretofore, gasoline station attendants carried out this procedure for automobiles as a service to customers, but the extent to which that service is available has dwindled due to the establishment of self-service gasoline stations. The burden of carrying out this messy task is left to the automobile operator who is generally reluctant to carry out the task because of its very messy nature. Many times the task is deferred until it can be done without soiling clothing and/or hands or until someone else can do it. This, of course, leads to long periods between oil level checks which in turn results in otherwise avoidable damage to the engine due to the operation of the engine with a low crankcase oil level. While many automobiles have a oil pressure indicator that presents an indication when there is an oil problem, the appearance of such an indication due to a low oil level is usually untimely in that the engine has already been operated at an unacceptable level for a long period of time.

Electronic circuitry is known for the detection of engine crankcase oil level which includes a conductive probe that is in contact with the oil in the crankcase of an engine when the oil is at an acceptable level and is out of contact with the oil when the oil is at an unacceptable level. Such known circuitry recognizes that it is desirable to obtain a signal indicative of the oil level a short time after the engine has been turned off since oil at very low temperatures can give rise to an oil level detection that will produce a low oil level indication when in fact the oil level is acceptable. Such known circuitry uses a timing circuit for producing a clock signal upon completion of a time period after the engine has been turned off to store a signal indicative of a low oil level condition. The stored signal indicative of a low oil level condition is subsequently used when operation of the engine is again initiated to provide a discernible indication of the unacceptable oil level condition. Such known circuitry provides for the immediate entry of a signal indicative of an acceptable oil level which if present at the time an engine is started will provide a perceptible indication indicative of an acceptable oil level. Due to the immediate entry of a signal indicative of an acceptable oil level, it is possible to have an unacceptable oil level indication presented which is changed to an acceptable oil level indication due to oil splashing upon the oil probe upon engine start up causing confusion as to what is to be considered the proper oil level indication. The known circuitry uses logic devices requiring clock pulses for operation which are susceptible to starter motor transient signals, R.F. fields and ignition current spikes giving rise to the entry of erroneous signals. In addition, the known circuitry is complex and does not provide adequate protection for the input device that connects with the conductive probe that is used.

SUMMARY OF THE INVENTION

The problems encountered in prior known liquid level sensing circuitry are avoided by circuitry embodying the present invention with enhanced operation obtained wherein the circuitry is adapted for energization from a d.c. source and includes a first means having a conductive probe adapted for connection to the d.c. source for providing a first signal at said conductive probe when the liquid sensed is not in contact with said conductive probe and providing a second signal when the liquid sensed is in contact with said conductive probe. A second means is provided that is operatively connected to said first means and includes a switched electrical power conductor for controlled application of d.c. power to the second means and provides a control point having a first state and a second state. The second means establishes the first state for the control point independent of the first means upon completion of a time period following the application of d.c. power to said second means via said switched electrical power conductor. This serves to establish the first state at the control point on a time basis when d.c. power has been applied as indicated. The second means establishes the second state for the control point if the second signal is present at the conductive probe for a period of time following the removal of d.c. power to the second means via the switched electrical power conductor. Accordingly, the control point will be in the first state when the d.c. power via the switched power conductor is removed from the second means with a period of time then needed before the second state for the control point, indicative of liquid in contact with the probe, can be presented. A third means is provided that is operatively connected to the second means and the switched electrical power conductor and includes a first and a second discernible indicator. If the first state for the control point is present after a period of time following termination of d.c. power to the second means via the switched electrical power conductor an d.c. power is again applied via said switched electrical power conductor the first discernible indicator operates indicating to the user that a low or unacceptable liquid level exists. If the second state for the control point is present when d.c. power is applied via the switched electrical conductor, the second discernible indicator operates indicating to the user that the liquid level is acceptable.

The second means includes a signal storage circuit portion which provides the control point for the second means. The second means also includes a delay circuit portion that provides a second control point which has a first and second state. This second control point is operatively connected to the signal storage circuit portion and to the third means which provides the discernible indicators. After it receives d.c. power via the switched electrical power conductor for a period of time, the delay circuit portion is operative to establish a second state at the second control point which is effective to establish the first state for the first-mentioned control point; prevent the second means from providing a second state at the first-mentioned control point and inhibit the operation of the first discernible indicator, such control continuing for a period of time after the d.c. power is removed via the switched electrical conductor. The first state for the first-mentioned control point serves to inhibit operation of the first discernible indicator. The first state for the second control point is established after the supply of d.c. power to the delay circuit portion via the switched electrical power conductor has been terminated for a period of time.

On-off control of the operation of the first discernible indicator is provided by an oscillator which is operatively connected to the two control points causing its operation and therefore any operation of the first discernible indicator to be inhibited when a second state is provided at either of the two control points. The signal storage circuit portion is operatively connected to the oscillator so that the oscillator, when operating, prevents the signal storage circuit from establishing its control point at the second state in response to momentary contact of the conductive probe with the liquid sensed. This serves to prevent the circuitry from giving an acceptable liquid level indication after an unacceptable indication has been initiated.

The switching of the switched electrical power conductor can be accomplished by an electrode controlled solid state switch. Such an arrangement is desirable since it permits the use of a limited current source with the control electrode.

The function of the signal storage circuit portion is provided in part by a capacitor. The capacitor is charged when an acceptable liquid level is present at the probe and the delay circuit portion is not in a condition to prevent such charging. The control point of the signal storage circuit portion is controlled by the level of charge on the capacitor. The signal storage circuit portion includes a charge maintenance circuit portion which is operative to provide a charging current to the capacitor once it has reached a level to establish the control point at its second state, which corresponds to an acceptable liquid level at the probe. This capacitor is discharged by the delay circuit portion after the d.c. power has been applied via the switch electrical power conductor for a period of time. This capacitor is also discharged at a limited rate by the oscillator, when operating, to prevent charging of the capacitor in response to momentary contact of the probe by the liquid sensed.

BRIEF DESCRIPTION OF THE DRAWINGS

The novel features and advantages of the present invention will become more apparent to those skilled in the art upon consideration of the following detailed description which refers to the accompanying drawing wherein.

DETAILED DESCRIPTION

Figure 1:
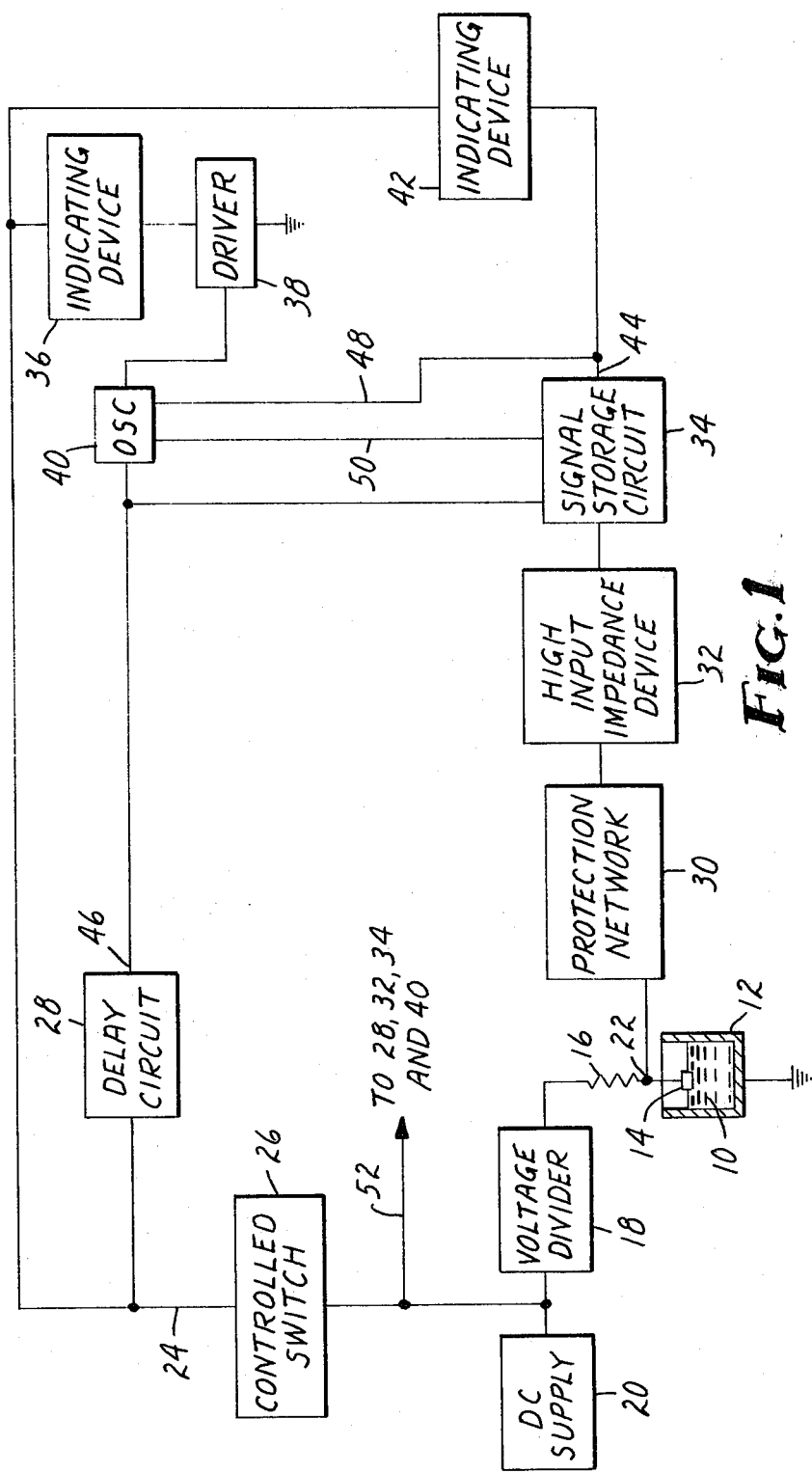
FIG. 1 is a block diagram of circuitry embodying the invention.

Referring to FIG. 1 of the drawings, a liquid level sensing circuit embodying the invention is shown. A first circuit portion which includes resistor 16 and a conductive probe 14 serves to provide a first signal when the liquid 10 in a container 12 is at an unacceptable level, i.e., not in contact with probe 14. A second signal is provided when the liquid 10 is at an acceptable level, i.e., in contact with the probe 14. The liquid 10 is connected to circuit ground. In the case of FIG. 1, this is accomplished via the container 12 which is of a conductive material and is connected to ground. The resistor 16 is connected to a voltage divider 18 which in turn is connected to a d.c. supply 20. The first and second signals provided by the first circuit portion are presented at the common connection 22 for resistor 16 and probe 14. The value selected for resistor 16 is such that proper voltage levels will be provided at 22 by the first circuit portion for use by the other circuit portions of FIG. 1. The first signal, which is presented when the liquid 10 is not in contact with the probe 14, is essentially equal to the voltage provided from the voltage divider 18. The second signal, which is presented when the liquid 10 is in contact with the probe 14, will be less than the voltage level provided by the first signal because of the voltage divider function provided by resistor 16 connected in series with liquid 10.

The circuitry of FIG. 1 is particularly useful to sense the crankcase oil level for an internal combustion engine and will be described in connection with such use. The container 12 for such an application is provided by the crankcase oil pan for the engine and the probe 14 is provided by a conductor positioned in the opening of the engine normally used for the oil dip stick for the engine. It is necessary, of course, that the probe 14 be insulated from the engine. When using the circuit to monitor the level of the engine oil, the engine battery can be used as the primary source for the d.c. supply 20. The circuitry including the voltage divider 18, resistor 16 and probe 14 can be connected at all times to the d.c. supply 20 since it draws a very small level of current due to the use of large resistor values and the high resistance presented by oil. The probe 24 extends into the crankcase area of the engine to the extent that it makes minimal contact with the engine oil when the oil is at the minimum acceptable level.

A second circuit portion of FIG. 1 serves to determine when and what portion of a third circuit portion will function to provide an indication of whether the oil level is acceptable or unacceptable. The second circuit portion is also arranged to prevent any indication action by the third circuit portion from occurring based on a momentary contact of probe 14 with the liquid 10. The second circuit portion is conditioned after operation of the engine has been terminated for a short time to reflect an unacceptable liquid level condition. An acceptable liquid level at the probe 14 is required to be sensed for a short time following such conditioning of the second circuit portion to cause the second circuit portion to be conditioned to reflect an acceptable liquid level condition. Upon subsequent applicaton of d.c. power to the second circuit portion via a switched electrical conductor, the second circuit portion provides for operation of the third circuit portion to provide a discernible indication for a limited time of an acceptable or unacceptable oil level. With such an arrangement, any acceptable oil level will be sensed while the oil is hot with such sensing retained by the second circuit portion for use when d.c. power is subsequently applied to the second circuit portion.

Referring to FIG. 1, a second circuit portion providing the aforementioned functions includes a switched controlled conductor 24 that connects with the d.c. supply 20 via a controlled switch 26, a delay circuit 28, a protection network 30, a high input impedance device 32 and a signal storage circuit 34. A third circcuit portion providing the indicating functions mentioned includes an indicating device 36 having a driver circuit 38 controlled by an oscillator 40 for providing an on-off discernible indication when the second circuit portion has been conditioned to reflect an unacceptable oil level and d.c. power has been applied to the indicating device 36 via the controlled switch 26 for the switch controlled electrical conductor 24. In addition, an indicating device 42 is included to provide an indication when the second portion has been conditioned to reflect an acceptable oil level and d.c. power is present at the conductor 24.

Referring to the second circuit portion of FIG. 1, the high input impedance device 32 is operatively connected via the protection network 30 to the connection 22 common to the probe 14 and resistor 16. Whether a protection network 30 is used depends on whether there is a need for protecting the input of device 32 from possible damage. The high input impedance device 32 receives the signal present at 22. If a first signal, indicative of the liquid 10 not in contact with probe 14, is present at 22, the device 32 presents a signal to the signal storage circuit 34 of one level with a signal of a second level being presented to circuit 34 when the device 32 receives a second signal from 22 that is indicative of the liquid 10 being in contact with probe 14.

How the signal storage circuit 34 responds to the signals from the device 32 is dependent on the operating status of delay 28 and oscillator 40. The function of the signal storage circuit 34 will first be considered without regard to delay 28 and oscillator 40. The signal storage circuit provides a control point 44 which will have a first state when a signal level like that which is due to a first signal at 22, indicative of the liquid 10 not being in contact with probe 14, is presented to the signal storage circuit. The control point 44 presents a second state when the signal level due to a second signal at 22, indicative of the liquid 10 being in contact with probe 14, is presented to the signal storage circuit for a period of time as opposed to momentary presentment of a second signal at 22 such as might occur due to movement of the liquid 10 causing it to make momentary contact with the probe 14.

The delay 28 is energized via the switch controlled electrical conductor 24 when the controlled switch 26 is operated to connect conductor 24 to the d.c. supply 20. The delay 28 provides a second control point 46 for the second circuit portion. The second control point 46 is operatively connected to the oscillator 40 and the signal storage circuit 34. The control point 46 presents either a first state or a second state. When the control point 46 presents its first state, oscillator 40 is allowed to operate provided the control point 44 at the signal storage circuit 34 which is connected to oscillator 40 via a conductor 48, is presenting a first state. When either of the control points 44 or 46 present a second state, operation of oscillator 40 is inhibited. The signal storage circuit 34 which connects with control point 46, is conditioned to present a first state at its control point 44 when the control point 46 of delay 46 presents its second state.

Assuming the delay circuit 28 has not been energized via conductor 24 and controlled switch 26, the control point 46 will present its first state. Upon being energized via conductor 24 and controlled switch 26, the delay circuit 28 initiates a first time delay, which when completed, causes the control point 46 to present its second state. Upon subsequent termination of d.c. power to the delay circuit 28 via the conductor 24 and controlled switch 26, a second time delay is initiated by the delay circuit 28, which when completed, causes the control point 46 to present its first state.

With the functioning of the various circuit components of the second and third circuit portion described, operation of the circuitry of FIG. 1 will now be described based on its use for monitoring the crankcase oil level of an internal combustion engine.

Assuming the engine has been operating wherein such operation results in the connection of conductor 24 to the d.c. supply 20 via control switch 26 and the first time delay provided by delay circuit 28 has expired, the control point 46 will present its second state preventing operation of oscillator 40 and causing the signal storage circuit 34 to be conditioned to present a first state at its control point 44 without regard to the signal at 22. With oscillator 40 inoperative, the driver 38 will not operate to energize the indicating device 36 and indicating device 42 is not energized since it requires a second state to be present at control point 44.

Upon termination of the operation of the engine, the controlled switch 26 is arranged to be operated so that it terminates the connection of conductor 24 to the d.c. supply 20 causing the delay circuit 28 to initiate its second time delay. The second time delay is long enough, for example two minutes, to allow oil within the engine to drain into the crankcase which provides the container 12. Upon completion of the second time delay, the control point 46 presents its first state. The signal storage circuit 34, which is then presenting a first state at the control point 44, can then cause a second state to be produced at the control point 44 in the event the probe 14 is in contact with the oil in container 12 for a time period as opposed to momentary contact of the oil with probe 14. Until a second state is presented at the control point 44, the oscillator 40 will continue to operate. It should be noted that the oscillator and signal storage circuit are operatively connected via a conductor 50 such that operation of the oscillator prevents momentary contact between the oil and probe 14 from causing the signal storage circuit 34 to produce a second state at the control point 44. If the oil does not contact the probe 14, the control point 44 remains in its first state.

It should be pointed out that once the signal storage circuit 34 causes a second state to be present at control point 44 due to the probe 14 contacting the oil 10, circuit 34 is arranged to function in a manner such that the second state at 44 is maintained until the delay circuit 28 is subsequently energized and the first time delay is completed to produce a second state at the control point 46 causing the signal storage circuit 34 to be conditioned to reflect a first state at control point 44. With this arrangement the presence of oil 10 at the probe 14 is sensed while the oil is still warm with the results obtained from such sensing being retained. With such an arrangement any change in the resistance of the oil 10 that may occur due to very low temperatures, causing the signal at 22 to indicate an unacceptable oil level condition, will not alter the state of the control point 44.

The next event to occur will be that of operating the engine again. It will be assumed that after the oil 10 has drained back to the container 12, the level of oil 10 is not sufficient to contact probe 14 so that the first state of control point 44 remains unaltered. Upon initiation of the operation of the engine, controlled switch 26 is operated to connect conductor 24 to the d.c. supply 20. This causes d.c. power to be presented to the indicating devices 36 and 42. Since a first state is present at the control point 44, device 42 will not operate. The delay circuit 28, which is connected to conductor 24, has its first time delay initiated. Until the first time delay is completed, the control point 46 presents its first state and since control point 44 presents its first state, oscillator 40 operates to control driver 38 causing indicating device 36 to be operated on and off per the frequency of the oscillator 40. Such operation of the indicating device 36 is terminated upon termination of the operation of oscillator 40 which occurs upon completion of the first time delay provided by the delay circuit 28 since the control point 46 then presents its second state which inhibits operation of the oscillator 40. The duration of the first time delay is on the order of sixty seconds, i.e., long enough so that the discernible indication provided by the operation of the indicating device 36 will be noticed by the operator of the engine.

If the oil 10 had drained back into the container 12 following termination of the operation of the engine, so that it would contact the probe 14, the storage circuit 34 would respond to present a second state at the control point 44. If this were the case, operation of the oscillator 40 would be inhibited by the second state at control point 44 so that indicating device 36 would not be energized upon operation of the controlled switch 26 when operation of the engine was initiated again. With d.c. power presented to indicating device 42 and the second state present at control point 44, the indicating device 42 is operated serving to provide the operator of the engine with a discernible indication that indicates the level of oil 10 is acceptable. Upon completion of the first time delay provided by the delay circuit 28 following the application of d.c. power via conductor 24, the control point 46 presents its second state causing the signal storage circuit 34 to be conditioned so the control point 44 presents a first state terminating the operation of the indicating device 42. As in the case for indicating device 36, the duration of operation of the indicating device 42 is the length of the first time delay provided by the delay circuit 42. Control point 46 presents its second state upon completion of the first time delay which is effective to prevent the signal storage circuit 34 from responding to a signal due to oil 10 contacting the probe 14 so that the control point 44 continues to present a first state.

The next event to occur, which causes a change in the operation of the circuitry of FIG. 1, is termination of the operation of the engine causing controlled switch 26 to be operated to disconnect conductor 24 from d.c. supply 20. Operation of the circuitry of FIG. 1 in response to such an event has already been discussed.

Certain parts of the circuitry of FIG. 1 required d.c. power for operation to provide the functions discussed. Such parts include the delay circuit 28, oscillator 24, high input impedance device 32 and signal storage circuit 34. Such application of d.c. power is indicated by conductor 52 which is connected at one end to the d.c. supply 20 with the other end indicated as connected to the parts mentioned above.

Figure 2:
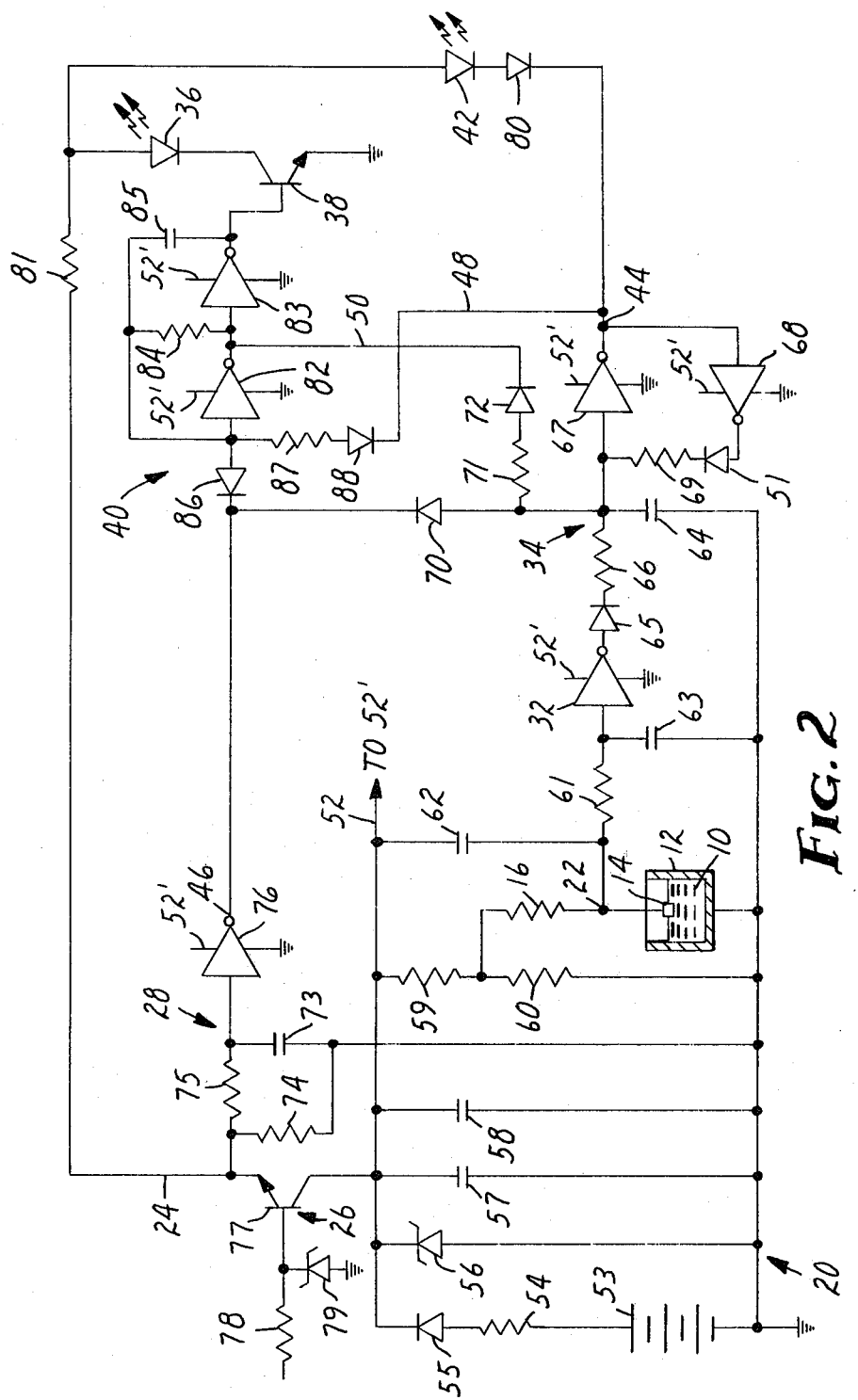
FIG. 2 is a schematic circuit showing circuit details for circuitry in accordance with FIG. 1.

Referring to FIG. 2 of the drawing, exemplary circuits for providing the various circuit portions of FIG. 1 are shown and arranged for operation in accordance with the description given for FIG. 1. Where appropriate, the same reference numerals used in FIG. 1 are also used in FIG. 2 to identify like parts or circuit portions.

In order that the battery for an internal combustion engine can be used as the primary source for the d.c. supply 20, it is desirable that additional circuitry be utilized with the battery to provide the d.c. supply. In FIG. 2, the d.c. supply 20 includes the battery 53 that is normally provided for an internal combustion engine plus a limiting resistor 54 which is connected in series with a diode 55 that is poled so that current flow is only away from the positive terminal of the battery 53. A Zener diode 56 is connected across the series combination of the battery 53, resistor 54 and diode 55 to limit the voltage from the d.c. supply 20. A 15 volt limit can be used for a 12 volt battery 53. Two capacitors 57 and 58 are connected in parallel with the Zener diode 56 which provide a filtering function. A voltage divider 18 is provided by two series connected resistors 59 and 60 which are connected in parallel with the Zener diode 56. The resistors 59 and 60 are selected to have very high resistance values so that the current drain on the battery 53 is minimal. The structure for the connection of the probe 14 to the voltage divider via a resistor 16 and its orientation with respect to the liquid 10 and conductive container 12 is in accordance with the structure shown in FIG. 1.

Devices of the 4000 series CMOS type can be used to provide the circuitry of FIG. 2. A number of inverters are used so a 4049 type device of the 4000 series is suitable. Each of the inverters in FIG. 2 are provided with d.c. power via the conductor 52 which connects the d.c. power 20 with each of the d.c. power inputs to the inverters. The reference numeral 52' is used to designate the d.c. power input for each inverter.

Inverter 32 can be used as the high input impedance device described in connection with FIG. 1. As indicated in connection with FIG. 1, the high input impedance device 32 is connected to the connection 22 common to the resistor 16 and probe 14 via a protection network which is provided to prevent damage to the high input impedance device 32. The protection network is indicated generally at 30 and includes a resistor 61 which is connected between the input to inverter 32 and the connection 22. The protection network 30 also includes two capaciators 62 and 63. Capacitor 62 is connected between the cathode of diode 55 of the d.c. power source 20 and the connecting point 22 while capacitor 63 is connected between the input of inverter 32 and ground.

Using a type 4049 inverter for inverter 32, a resistor 16 having a value of approximately $5 \times 10^9$ ohms in conjunction with a resistor 59 and 60 of about 0.68 and 1 megohm, respectively, allows the circuitry to be used with liquids for liquid 10 that present very high resistance as in the case of oil used for internal combustion engines. Accordingly, if the probe 14 is in contact with liquid 10, the input of inverter 32 will not be high enough to cause the inverter output to go low. Once the probe is out of contact with the liquid 10, the signal presented to the inverter will cause the output of the inverter to go low. With the resistance of resistors 59 and 60, which are always connected to the d.c. source 20, well in excess of 1 megohm, there is very little current drain on the battery 53 due to resistors 59 and 60.

A circuit, suitable for use to provide the functions of the signal storage circuit 34 of FIG. 1, is indicated generally at 34 in FIG. 2. It includes a resistor 66 which has one end connected to the output of inverter 32 via a diode 65. It also includes a capacitor 64 that is connected between the other end of resistor 66 and ground. The capacitor 64 will receive a charging current via the resistor 66 when the output of the inverter 32 is high, which occurs when there is contact between the probe 14 and the liquid 10. The storage circuit 34 also includes an inverter 67 which has its input connected to the connection common to resistor 66 and capacitor 64. When capacitor 64 is charged, which can occur when the liquid 10 is at an acceptable level to make contact with the probe 14, the input to inverter 67 is sufficient to cause the output of the inverter 67 to be low. The output of the inverter 67 provides the control point 44 for the second portion of the second circuit portion of the circuit described in connection with FIG. 1. Since the level sensing circuit is to be useful for detection of the oil level in the crankcase of an internal combustion engine, it is known that it is desirable to detect the oil level at a time shortly after the operation of the internal combustion engine has been terminated and that such detection condition be retained until the engine is again operated. For this reason, diode 65 is used and is poled so that capacitor 64 will not be discharged should the inverter 32 present a low condition at its output subsequent to the detection of an acceptable liquid level at the probe 14 following termination of the operation of the engine. The storage signal circuit is provided with a circuit portion that serves to maintain the charge on capacitor 64 once it has caused the output of inverter 67 to be low. Such storage maintenance circuit includes an inverter 68, diode 51 and resistor 69. The inverter 67 has its output connected to the input of inverter 68. The output of inverter 68 connects with input of inverter 67 via resistor 69 connected in series with diode 51. Diode 51 is poled so the capacitor 64 will not be discharged via resistor 69 when the output of inverter 68 is low. Once the capacitor 64 is charged to the level sufficient to cause the output of the inverter 67 to go low, the inverter 68 will present a high at its output to provide a charge path for the capacitor 64. The signal storage circuit 34 also includes a diode 70 that has its anode connected to the connection common to resistors 66 and capacitor 64 and is utilized to couple the storage signal circuit 34 to a second control point 46. The signal storage circuit 34 also includes a resistor 71 which is connected in series with a diode 72 for connecting between the connection common to resistor 66 and capacitor 64 and conductor 50 for making connection to the oscillator 40 as described in connection with FIG. 1. Diodes 70 and 72 are poled so that any current flow is in the direction away from capacitor 64, i.e., in a discharge direction.

A suitable delay circuit 28 includes a capacitor 73, two resistors 74 and 75 plus an inverter 76. The resistor 75 is connected between a switch controlled electrical conductor 24 and the input to inverter 76. The capacitor 73 is connected between the input to the inverter 76 and ground. Resistor 74 is connected between the switch controlled electrical conductor 24 and ground. A controlled switch 26 for controlling the connection of the d.c. supply 20 to the switched electrical conductor 24 can take the form of an electrode controlled solid state switch such as an NPN transistor 77 with its emitter connected to the conductor 24, its collector connected to the d.c. supply 20 and its base, as the central electrode, connected to a resistor 78. A Zener diode is also connected between the base of the transistor 77 and ground to control the voltage level applied to the base of the transistor. A positive voltage is applied to the base of the transistor via the resistor 78 serves to turn the transistor 78 on and operate at saturation. The resistor 78 can be connected to any conductor which is presented with a positive voltage following movement of the ignition switch for the engine to the "on" position. The resistor 78 could also be suitably coupled to the alternator for the engine to sense a positive voltage which would be present at the time of engine operation. The use of an electrode controlled solid state switch for switch 26 permits the use of limited current source for its operation. The controlled switch 26 could also take the form of the reed switch wherein the electrical winding needed for operation of the reed switch can be energized in response to operation of the ignition switch to the engine to the "on" position. While the conductor 24 could be connected to a conductor which connects with the battery 53 upon operation of the engine ignition switch, such an arrangement is not preferred in that the conductor 24 could be supplied with a voltage that is in access to that which is supplied by the d.c. supply 20 which could give rise to some problems with respect to operation of the circuitry. The use of a transistor arrangement or a reed switch arrangement that has been described would be preferred in that such arrangements allow the voltage needed for controlling their operation to be obtained from various points while only providing voltage to the conductor 24 from the d.c. supply 20.

Returning to the delay circuit 28, the capacitor 73 is charged via the resistor 75 to provide a first time delay when the controlled switch 26 is operated to connect the d.c. supply 20 to the conductor 24. The values of resistor 75 and capacitor 73 are selected so that the first time delay is about 60 seconds. The first time delay is the time needed for the voltage on the capacitor 73 to reach a value to cause the output of the inverter 76 to change from a high to a low condition. The output of the inverter 76 provides the second control point 46 for the second circuit portion, as described in connection with FIG. 1, with a high at the output of the inverter 76 providing the first state for the control point 46 and a low at the output of the inverter 76 providing the second state for the control point 46. Once the control point 46 is provided with a low or second state, such state continues until the controlled switch 26 is operated to disconnect the conductor 24 from the d.c. supply 20 allowing discharge of the capacitor 73 via resistors 75 and 74 to a level to cause the output of the inverter 76 to change from a low to a high condition. It should be noted that the control point 46, provided by the output of the inverter 76, is connected to the diode 70 of the signal storage circuit 34 causing the capacitor 64 to be discharged when the control point 46 provided by the output of inverter 76 is in its low or first state. Since the diode 70 is poled so as to provide for the discharge of capacitor 64 when the output of inverter 76 is low, the capacitor 64 will not be charged due to the presence of a high signal at the output of the inverter 76.

The circuitry remaining to be described in connection with FIG. 2 is that circuitry which provides a first discernible indication when the control point 44 presents a high or first state and provides a second discernible indication when the control point 44 presents a low or second state. Circuitry used to provide the first discernible indication includes an LED 36, an NPN transistor 38 and an oscillator 40. Circuitry used to provide the second discernible signal includes an LED 42 and a diode 80. A limiting resistor 81 that is common to LED 36 and 42 is used to connect both LED 36 and 42 to the switched electrical conductor 24. The diode 80 used with the LED 42 has its anode connected to the LED and its cathode connected to the control point 44. The LED 42 will be energized when the conductor 24 is connected to the d.c. supply 20 and the second control point 44 provided by the signal storage circuit 34 presents a low or second state. The LED 36 is connected to ground via the collector and emitter of the NPN transistor 38 wherein the emitter is connected to ground. The base of the transistor is connected to the oscillator 40. An exemplary circuit for oscillator 40 includes two inverters 82 and 83, a resistor 84 and a capacitor 85. The output of the inverter 82 is connected to the input of inverter 83 which has its output connected to the input of inverter 82 via the capacitor 85 and to the output of inverter 82 via the capacitor 85 and resistor 84. When the oscillator 40 is operating, the output of inverter 83 alternates from low to high to low at the frequency of the oscillator as determined by the values of resistor 84 and capacitor 85. When the output of the inverter 83 is high and the conductor 24 is connected to the d.c. supply 20 by operation of the switch 26 the transistor 38 is turned on causing the LED 36 to be energized. The transistor 38 is turned off when the output of the inverter 83 is low. Accordingly, the LED 36 is turned on and off in accordance with frequency of operation of the oscillator 40 when the oscillator is operating and the d.c. supply 20 is connected to the conductor 24 by operation of the switch 26. A suitable frequency for the oscillator can be one cycle per second. The oscillator 40 also includes a diode 86 which connects the input of the inverter 82 to the control point 46 provided by the output of inverter 76. The diode is poled so that a low or second state provided at the control point 46 is effective to terminate or inhibit operation of the oscillator 40. Oscillator 40 also includes a resistor 87 connected in series with a diode 88 which with conductor 48 connect the input of the inverter 82 to the control point 44 provided by the signal storage circuit 34. The diode 88 is poled so that operation of the oscillator 40 is terminated or inhibited when the control point 44 presents a low or second state.

Mention was made when describing the signal storage circuit 34 that a resistor 71 connected in series with a diode 72 is used to connect the capacitor 64 via a conductor 50 to the oscillator 40. The conductor 50 connects to the output of inverter 82. Since the inverter 82 will present a low at its output for a portion of each cycle of operation of the oscillator 40, resistor 71 and diode 72 will provide a discharge path for capacitor 64 when such low is presented at the output of inverter 82. As will be explained in connection with the overall operation of the circuitry of FIG. 2, such discharge path prevents the capacitor 64 from being charged in response to momentary contact of the probe 14 with the liquid 10 in container 12.

With the description and functioning of the various independent circuit portions of the FIG. 2 completed, operation of the circuitry of FIG. 2 will now be described based on its use for monitoring the crankcase oil level of an internal combustion engine.

For a starting point it will be assumed that the engine has been operating wherein conductor 24 is connected to the d.c. supply via control switch 26 for a time such that capacitor 73 of the delay circuit 28 has been charged to a level causing the output of the inverter 76 to present a low or second state so that operation of the oscillator 40 is prevented from operating due to the connection of the oscillator via diode 86 to the control point 46. In addition, any charge at capacitor 64 of the signal storage circuit 34 has been discharged in response to the low or second state presented at the control point 46 causing the output of the inverter 67 to present a high or first state for the control point 44. Since the capacitor 64 can not be charged due to the low or second state at control point 46, it can be seen that the control point 44 presents a high or first state without regard to the signal that may then be present at the connection 22 which connects with the probe 14. With oscillator 40 inoperative, the transistor 38 will not operate to energize the LED 36 and the LED 42 will not be energized since it requires a low or second state to be present at the control point 44 provided by the signal storage circuit 34.

Upon termination of the operation of the engine, the controlled switch 26 will be operated so that it terminates the connection of conductor 24 to the d.c. supply 20 causing the delay circuit 28 to initiate its second time delay. This time delay is determined by the time it takes to discharge capacitor 73 via resistor 75 and 74 to a level that causes the inverter 76 to change its output from a low or second state to a high or first state. The time that it takes for the capacitor 73 to be discharged to this level is arranged to be long enough to allow oil within the engine to drain into the crankcase which provides the container 12. A time delay of two minutes is considered sufficient. Upon completion of the second time delay, which occurs when the control point 46 presents its first state allowing the capacitor 64 to be charged in the event the probe 14 is in contact with the oil in container 12 for a period of time as opposed to momentary contact of the oil with probe 14 to cause the control point 44 to change from its first state to its second or low state. The oscillator 40 will operate until such second state is presented at the control point 44. With the oscillator 40 operating, any momentary contact between the oil and probe 14 giving rise to a charging current for capacitor 64 is offset by the discharge path provided from the capacitor 64 via resistor 71 and diode 72 to the oscillator 40 for such time as the inverter 82 presents a low during each cycle of operation of the oscillator 40. If the oil which drains back into the container 12 does not provide a level such as to bring the oil into contact with probe 14 the capacitor 64 will remain uncharged causing the control point 44 to remain in its high or first state.

Assuming the oil 10 does not reach a level sufficient to contact probe 14 the high first state for control point 44 remains unaltered. The next event to occur will be that of operating the engine again. Upon initiation of operation of the engine, control switch 26 is operated to connect conductor 24 to the d.c. supply 20. This causes d.c. power to be presented to the indicating devices 36 and 42 via the resistor 81 and to the delay circuit 28. Since a high or first state is present at the control point 44 provided by the output of the inverter 67, the LED 42 will not be energized. The delay circuit 28, which is connected to conductor 24, has its first time delay initiated. Until it is completed, the control point 46 provided by the delay circuit 28 presents a high or first state allowing the oscillator 40 to operate. with the oscillator 40 operating, the transistor 38 is operated on and off per the frequency of the oscillator 40 causing the LED 36 to be turned on and off in accordance with the operation of the oscillator 40. Such operation of the LED 36 continues until the operation of oscillator 40 is terminated. The operation of oscillator 40 is terminated upon completion of the first time delay provided by delay circuit 28 which occurs when the capacitor 73 is charged to a level sufficient to present a high signal to the input of the inverter 76 causing its output to go low and thus present a low or second state for the control point 46 which serves to terminate or inhibit operation of the oscillator 40. As has been indicated, the values for capacitor 73 and resistor 75 are selected so that the time required for the capacitor to be charged to provide a high input to the inverter 46 is on the order of 60 seconds which is considered long enough to provide the discernible indication by the on/off operation of the LED 36 to bring it to the attention of the operator of the engine. While not shown, the LED 36 can be arranged so that it will provide a red indication.

Assuming the oil 10 had drained back into the container 12 following termination of the operation of the engine, so that it would contact the probe 14, the voltage at connection 22 would be at a level causing the output of the inverter 32 to be high causing capacitor 64 to be charged. Though oscillator 40 would be operating, the discharge level that is provided by resistor 71 and diode 72 to the oscillator 40 during its operation is not sufficient to interfere with the charging of the capacitor 64 when the output of the inverter 32 remains high for a period of time. The charge on capacitor 64 reaches a point at which the inverter 67 through the signal storage circuit 34 operates to provide a low or second state for the control point 44. With the low or second state provided at the control point 44 operation of the oscillator 40 is discontinued due to the connection provided between the oscillator 40 and control point 44 by resistor 87 and diode 88. When operation of the engine is then subsequently initiated, the control switch 26 is again operated to provide a connection between the conductor 24 and the d.c. supply 20 to provide power to the delay circuit 28 and to LED 36 and 42 via the resistor 81. LED 36, of course, will not be energized, since the oscillator 40 is not operating due to the presence of the second state at the control point 44 provided by the signal storage circuit 34. The LED 42 will be energized since it connects via diode 80 with the low or second state provided by the control point 44. Operation of the LED 42 provides the operator of the engine with a discernible indication to indicate that the level of the oil 10 is acceptable. While not shown, the LED 42 can be arranged so that it will provide a green indication. Upon completion of the first time delay provided by the delay circuit 28, the control point 46 presents its second or low state causing the capacitor 64 of the signal storage circuit 34 to be discharged so that the inverter 67 of circuit 34 presents its first or high state terminating the operation of the LED 42. As indicated for the operation of LED 36, the duration of operation of LED 42 is the length of the first time delay provided by the delay circuit 28. With the control point 46 presenting its second or low state upon completion of the first time delay to provide a discharge point for the capacitor 64, capacitor 64 cannot be charged in response to a signal at connection 22 due to the oil 10 contacting the probe 14 so the output of the inverter 67 providing the control point 44 continues to present a first or high state.

The next event to occur which causes a change in the operation of the circuitry of FIG. 2 is termination of the operation of the engine which causes the controlled switch 26 to be operated to disconnect conductor 24 from the d.c. supply 20. The delay circuit 28 is therefore disconnected from the d.c. supply 20 allowing the capacitor 73 to be discharged via the resistors 74 and 75 to provide the second time delay for the delay circuit 28. Upon completion of the second time delay the output of the inverter 76 will provide a first or high state for control point 46 allowing the capacitor 64 to again be charged in the event the oil 10 reaches the level to contact probe 14. The operation of the circuitry of FIG. 2 has already been discussed with respect to the situation where the probe contacts the oil 10 and for the situation where the probe 14 does not contact the oil 10.

It will be obvious to those skilled in the art that the many modifications and variations of the present invention are possible in light of the above teachings. It is therefore to be understood that within the scope of the appended claims, the invention may be practiced otherwise then as specifically described.

I claim:

1. Liquid level sensing circuitry adapted for energization from a d.c. power source including:

a first circuit portion having a conductive probe adapted for connection to the d.c. source for providing a first signal at said conductive probe when the liquid is not in contact with said conductive probe and providing a second signal when the liquid sensed is in contact with said conductive probe;

a second circuit portion operatively connected to said first circuit portion and including a switched electrical power conductor for controlling the application of d.c. power to said second circuit portion and a control point for providing a first state for said control point independent of said first circuit portion upon completion of a time period following the application of d.c. power to said second circuit portion via said switched electrical power conductor and for providing a second state for said control point provided said second signal is present for a period of time following the removal of d.c. power to said second circuit portion via said switched electrical power conductor; and a third circuit portion operatively connected to said second circuit portion and said switched electrical power conductor of said second circuit portion and having a first discernible indicator for providing a first discernible indication in response to said first state of said control point if present after a period of time following termination of d.c. power to said second circuit portion via said switched electrical power conductor plus subsequent supply of d.c. power via said switched electrical power conductor and a second discernible indicator for providing a second discernible indication in response to said second state at said control point and the supply of d.c. power via said switched electrical power conductor.

2. Liquid level sensing circuitry according to claim 1 wherein said second circuit portion includes a signal storage circuit portion operatively connected to said first circuit portion and including said control point of said second circuit portion; said second circuit portion further including a delay circuit portion operatively connected to the said switched electrical power conductor and having a second control points operatively connected to said signal storage circuit portion and said third means for providing a first state for said second control point after the supply of d.c. power of said delay circuit portion via said switched electrical power conductor has been terminated for a period of time, and for providing a second state for said second control point following the application of d.c. power to said delay circuit for a period of time via said switched electrical power conductor for establishing said first state for said first-mentioned control point, preventing said signal storage circuit portion from operating to provide said second state of said first-mentioned control point and inhibiting the operation of said third circuit portion to provide said first discernible indication.

3. Liquid level sensing circuitry according to claim 2 wherein said signal storage circuit portion includes a capacitor operatively connected to said conductive probe and to said second control point, the charge level of said capacitor determining the state of said first-mentioned control point, said capacitor receiving a current for charging said capacitor when said conductive probe provides said second signal and said first state is provided at said second control point, said signal storage circuit including a charge maintenance circuit portion operatively connected to said first-mentioned control point for providing charging current to said capacitor when said second state is present at said first-mentioned control point.

4. Liquid level sensing circuitry according to claim 2 wherein said third circuit portion includes an oscillator circuit operatively connected to said first discernible indicator for controlling the operation of said first discernible indicator when said first state of said first-mentioned control point is present, said oscillator circuit operatively connected to said second control point to inhibit operation of said oscillator circuit while said second state of said second control point is present.

5. Liquid level sensing circuitry according to claim 4 wherein said signal storage circuit portion is operatively connected to said oscillator for preventing said signal storage circuit when said oscillator is in operation from establishing said second state at said first-mentioned control point in response to said second signal when produced by momentary contact of said conductive probe with the liquid sensed.

6. Liquid level sensing circuitry according to claim 4 wherein said oscillator circuit is operatively connected to said first-mentioned control point for inhibiting the operation of said oscillator circuit when the said second state of said first-mentioned control point is present.

7. Liquid level sensing circuitry according to claim 4 wherein said signal storage circuit portion includes a capacitor operatively connected to said conductive probe, to said second control point and to said oscillator, the charge on said capacitor determining the state of said first-mentioned control point, said capacitor receiving current for charging said capacitor when said conductive probe provides said second signal and said first state is provided at said second control point, said oscillator when operating providing limited discharge of said capacitor for a portion of each cycle of operation of said oscillator preventing said capacitor from reaching a charge level to establish said second state at said first-mentioned control point signal when produced by momentary contact of said conductive probe with the liquid sensed.

8. Liquid level sensing circuitry according to claim 1 wherein said switched electrical power conductor includes an electrode controlled solid state switch operatively connected for providing the switching action for the application of d.c. power to said second means from the d.c. power source, said electrode controlled solid state switch having a control electrode for permitting the switching by said control electrode of said electrode controlled solid state switch from a limited current source.

* * * * *